US012639321B2

(12) United States Patent
Tu et al.

(10) Patent No.: US 12,639,321 B2
(45) Date of Patent: May 26, 2026

(54) ELECTRONIC DEVICE AND APPLICATION SEARCH METHOD THEREOF

(71) Applicant: ASUSTek COMPUTER INC., Taipei City (TW)

(72) Inventors: Chang-Jhu Tu, Taipei City (TW); Chun-Yi Wang, Taipei City (TW); Yu-Hsuan Lee, Taipei City (TW); Yi-Siang Chen, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 0 days.

(21) Appl. No.: 19/074,467

(22) Filed: Mar. 10, 2025

(65) Prior Publication Data

US 2025/0321969 A1     Oct. 16, 2025

(30) Foreign Application Priority Data

Apr. 16, 2024    (TW) ................................. 113114127

(51) Int. Cl.
 *G06F 16/2457*        (2019.01)
 *G06F 16/242*          (2019.01)
(52) U.S. Cl.
 CPC ...... *G06F 16/24578* (2019.01); *G06F 16/243* (2019.01)
(58) Field of Classification Search
 None
 See application file for complete search history.

(56) References Cited

U.S. PATENT DOCUMENTS

| | | | |
|---|---|---|---|
| 2009/0012778 A1 * | 1/2009 | Feng ................... | G06F 16/3329 |
| | | | 707/E17.014 |
| 2022/0358294 A1 * | 11/2022 | Huang .................. | G06F 16/258 |
| 2023/0385340 A1 * | 11/2023 | Boué ................. | G06F 16/90344 |
| 2025/0156428 A1 * | 5/2025 | Lee ........................ | G06F 16/243 |

FOREIGN PATENT DOCUMENTS

| | | | | |
|---|---|---|---|---|
| CN | 114638211 | 6/2022 | | |
| KR | 20210038496 A | * 4/2021 | ......... | G06Q 30/0256 |
| WO | 2022143083 | 7/2022 | | |

* cited by examiner

*Primary Examiner* — Uyen T Le
(74) *Attorney, Agent, or Firm* — JCIPRNET

(57)          ABSTRACT

An electronic device and an application search method thereof are provided. The method includes the following steps. A plurality of semantic feature vectors of each of a plurality of application is recorded. The semantic feature vectors of each of the applications at least include a first semantic feature vector associated with one of application categories and a second semantic feature vector associated with one of expanded related words. A query string is obtained via the input device. A query semantic feature vector of the query string is generated by using a natural language model. A plurality of semantic similarities between the query semantic feature vector and the semantic feature vectors of each application are determined. A target application corresponding to the query string is determined from the applications according to the semantic similarities corresponding to the semantic feature vectors of each application.

11 Claims, 6 Drawing Sheets

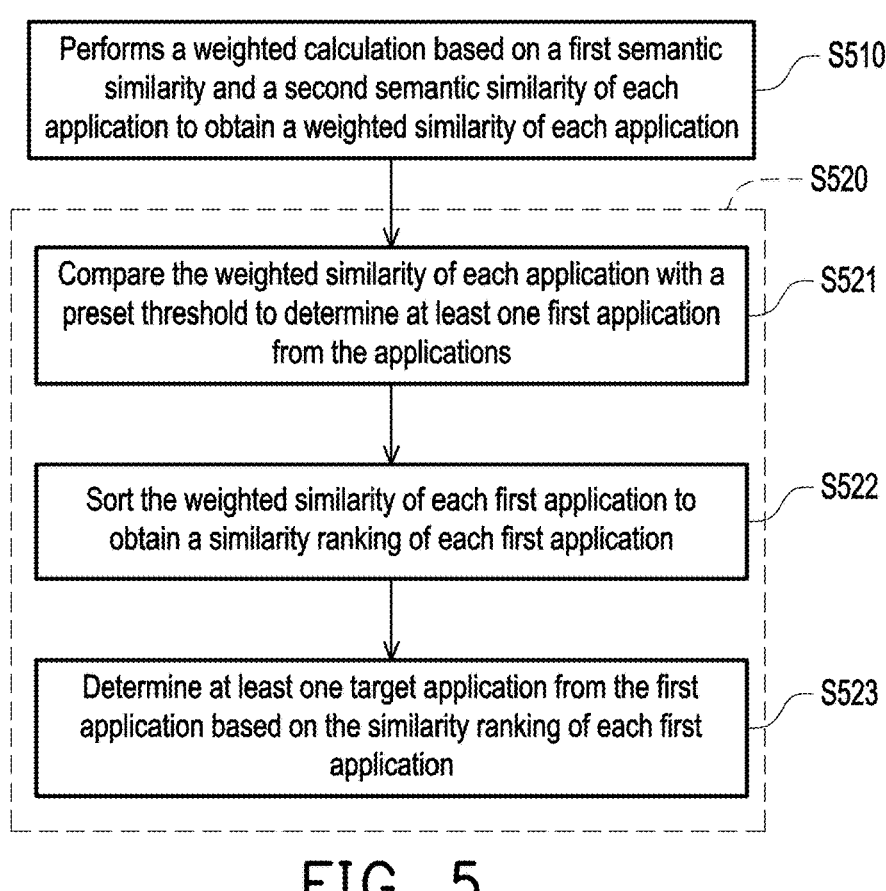

Performs a weighted calculation based on a first semantic similarity and a second semantic similarity of each application to obtain a weighted similarity of each application — S510

— S520

Compare the weighted similarity of each application with a preset threshold to determine at least one first application from the applications — S521

Sort the weighted similarity of each first application to obtain a similarity ranking of each first application — S522

Determine at least one target application from the first application based on the similarity ranking of each first application — S523

FIG. 5

Compare the first semantic similarity of each application with the preset threshold and compare the second semantic similarity of each application with the preset threshold, to determine at least one first application from the applications — S610

Sort the first semantic similarity and the second semantic similarity of each first application to obtain a similarity ranking of each first application — S620

Determine at least one target application from the first application based on the similarity ranking of each first application — S630

FIG. 6

ELECTRONIC DEVICE AND APPLICATION SEARCH METHOD THEREOF

CROSS-REFERENCE TO RELATED APPLICATION

This application claims the priority benefit of Taiwan application serial no. 113114127, filed on Apr. 16, 2024. The entirety of the above-mentioned patent application is hereby incorporated by reference herein and made a part of this specification.

BACKGROUND

Technical Field

This disclosure is related to an electronic device and an application search method thereof.

Description of Related Art

Currently, electronic devices are equipped with a large number of applications, offering various functionalities that make the lives of modern people more convenient. As the number and types of applications increase, users may forget the name of the application because they have not used it for a while, resulting in the inability to activate the required application immediately. Although users may search for the needed applications by entering keywords, they need to input the keywords very precisely to find the applications they truly need. Since users may not be familiar with the exact names of applications, they might need to spend time trying multiple keywords to get search results that match their needs. Users may even encounter situations where they struggle to find the desired application despite multiple attempts. When users are forced to sift through a vast list of applications one by one, this search process becomes even more time-consuming.

SUMMARY

This disclosure provides an application search method adapted to an electronic device with a plurality of applications installed. This method includes the following steps. A plurality of semantic feature vectors of each of the applications is recorded, wherein the semantic feature vectors of each of the applications at least comprise a first semantic feature vector associated with one of application categories and a second semantic feature vector associated with one of expanded related words. A query string is obtained via an input device. A query semantic feature vector of the query string is generated by using a natural language model. A plurality of semantic similarities between the query semantic feature vector and the semantic feature vectors of each of the applications are determined. At least one target application corresponding to the query string is determined from the applications according to the semantic similarities corresponding to the semantic feature vectors of each of the applications.

This disclosure provides an electronic device is installed with a plurality of applications and includes an input device, a storage device and a processor. The storage device is configured to record instructions. The processor is coupled to the input device and the storage device and is configured to execute the aforementioned instructions to perform the following operations. A plurality of semantic feature vectors of each of the applications is recorded, wherein the semantic feature vectors of each of the applications at least comprise a first semantic feature vector associated with one of application categories and a second semantic feature vector associated with one of expanded related words. A query string is obtained via an input device. A query semantic feature vector of the query string is generated by using a natural language model. A plurality of semantic similarities between the query semantic feature vector and the semantic feature vectors of each of the applications are determined. At least one target application corresponding to the query string is determined from the applications according to the semantic similarities corresponding to the semantic feature vectors of each of the applications.

Based on the above, in the embodiment of the disclosure, the semantic feature vectors of each application may include a first semantic feature vector associated with one of application categories and a second semantic feature vector associated with one of expanded related words. The query semantic feature vector of the query string may be generated using a natural language model. Furthermore, the query semantic feature vector of the query string may be compared with the first semantic feature vector and the second semantic feature vector corresponding to each application to obtain multiple semantic similarities. Therefore, the search results of the query string may be determined according to the semantic similarities corresponding to each application program, and at least one target application is provided as the search result of the query string. Based on this, even if users do not input the exact name of the application for searching, they can still find the applications that meet their expectations, thus significantly improving the convenience of searching for applications.

In order to make the present disclosure more obvious and understandable, embodiments are given below and described in detail with reference to the attached drawings.

BRIEF DESCRIPTION OF THE DRAWINGS

FIG. 5 is a flowchart of determining search results according to an embodiment of the disclosure.

FIG. 6 is a flowchart of determining search results according to an embodiment of the disclosure.

DESCRIPTION OF THE EMBODIMENTS

Some embodiments of the disclosure may be described in detail with reference to the accompanying drawings. The component symbols cited in the following description may be regarded as the same or similar components when the same component symbols appear in different drawings. These embodiments are only part of the disclosure and do not disclose all possible implementations of the disclosure.

Rather, these embodiments are merely examples of devices and methods within the scope of the patent application of the disclosure.

Figure 1:
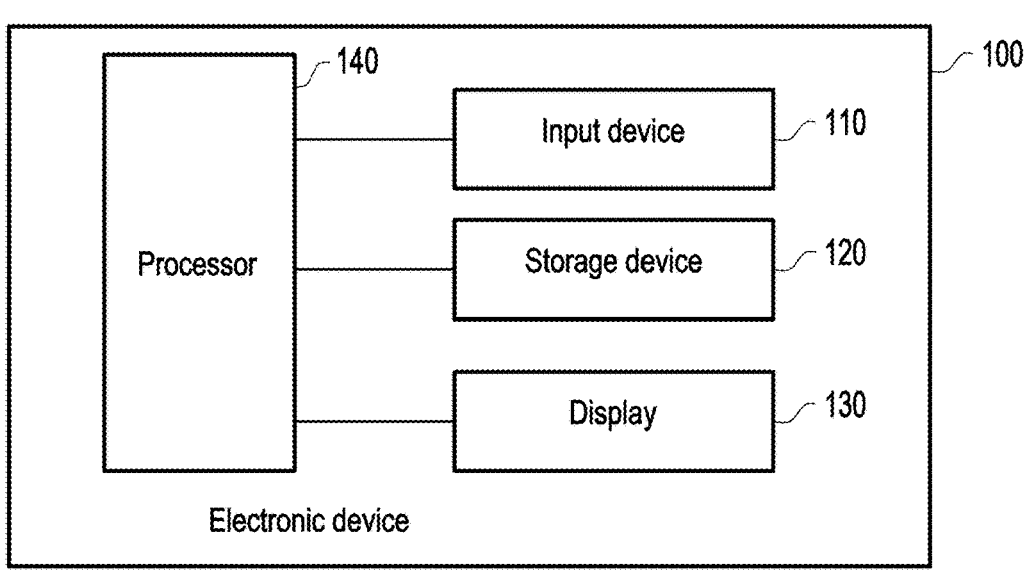
FIG. 1 is a block diagram of an electronic device according to an embodiment of the disclosure.

Referring to FIG. 1, in an embodiment, the electronic device 100 may include an input device 110, a storage device 120, a display 130 and a processor 140. The electronic device 100 may be, for example, a smartphone, a notebook computer, a tablet computer, a desktop computer, or a smart wearable device, etc., which is not limited thereto. In addition, in some embodiments, the electronic device 100 may be implemented by one or more electronic devices with computing capabilities.

The input device 110 is configured to receive user input, such as a touch input device, keyboard, mouse or microphone, etc., which is not limited in the disclosure. In an embodiment, the input device 110 may be configured to receive a query string input by the user.

The storage device 120 is configured to store data and software modules (such as operating systems, applications, drivers) for access by the processor 140. The storage device 120 may be, for example, any type of fixed or removable random access memory (random access memory (RAM), read-only memory (ROM), flash memory (flash memory), hard disk, or a combination thereof.

The display 130 is, for example, a liquid crystal display (LCD), a light-emitting diode (LED) display, an organic light-emitting diode display (OLED) or other types of displays., which is not limited in the disclosure. In an embodiment, the display 130 may display a user operation interface for receiving query strings, and may also display search results.

The processor 140 is coupled to the input device 110, the storage device 120, and the display 130. The processor 140 is, for example, a central processing unit (CPU), an application processor (AP), or other programmable general-purpose or special-purpose microprocessor, digital signal processor (DSP), image signal processor (ISP), graphics processor (graphics processing unit, GPU) or other similar devices, integrated circuits and combinations thereof. In some embodiments, the processor 140 may access and execute the software module recorded in the storage device 120 to implement the application search method in the embodiment of the disclosure. The software modules described above may be broadly construed to mean instructions, instruction sets, code, programs, applications, software packages, threads, functions, etc., whether referred to as software, firmware, middleware, microcode, hardware description language, or others.

In an embodiment, the electronic device 100 is installed with a plurality of applications. When users input a query string, electronic device 100 can provide a search result including one or more target applications, allowing users to avoid spending time repeatedly browsing through layers of operating interfaces or trying different search strings multiple times to find the applications they need.

Figure 2:
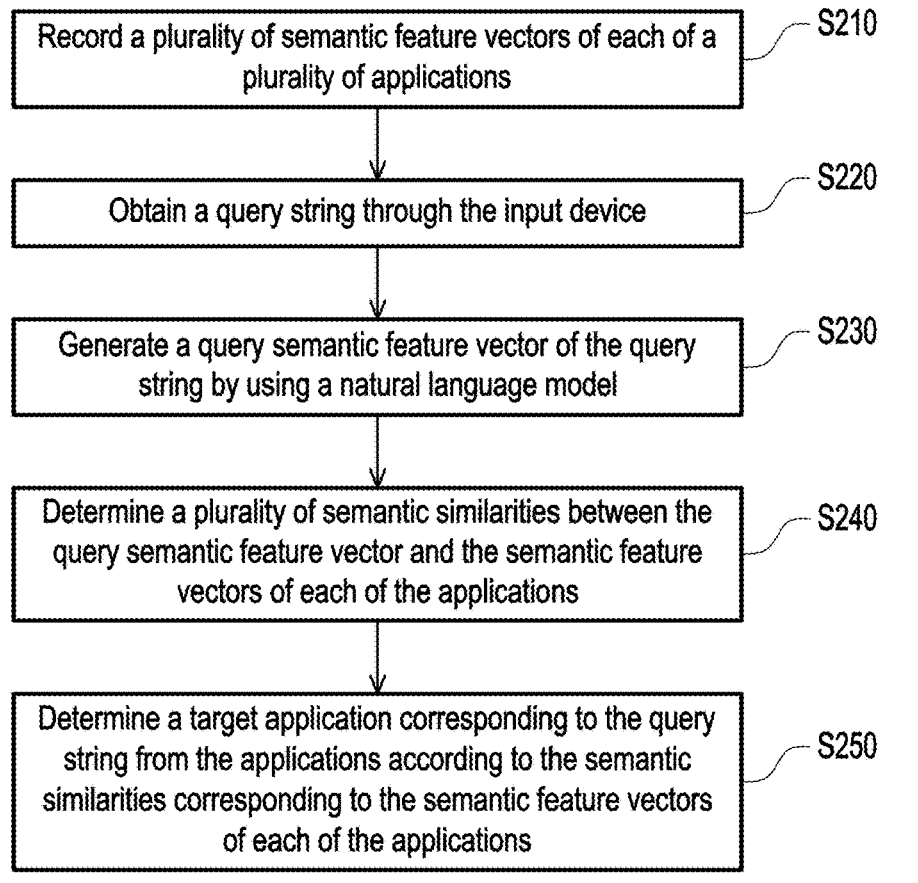
FIG. 2 is a flowchart of an application search method according to an embodiment of the disclosure.

Referring to FIG. 1 and FIG. 2, the method of this embodiment is applicable to the above-mentioned electronic device 100. The following is a detailed description of the application search method in this embodiment using various components of the electronic device 100. To illustrate possible embodiments of the present disclosure clearly, FIG. 3 may be used for explanation. Please also refer to FIG. 3.

In step S210, the processor 140 may use the storage device 120 to record a plurality of semantic feature vectors SF2 of each of a plurality of applications. In detail, the storage device 120 may store a feature vector database db2, which records multiple semantic feature vectors SF2 of the applications. These semantic feature vectors SF2 are generated using a natural language model M1. The application information S1 of each application may be input to the natural language model M1 respectively, so that the natural language model M1 outputs the corresponding semantic feature vectors SF2. In other words, the natural language model M1 may translate the application information S1 of each application into multiple semantic feature vectors SF2 in the multi-dimensional feature vector space.

Figure 3:
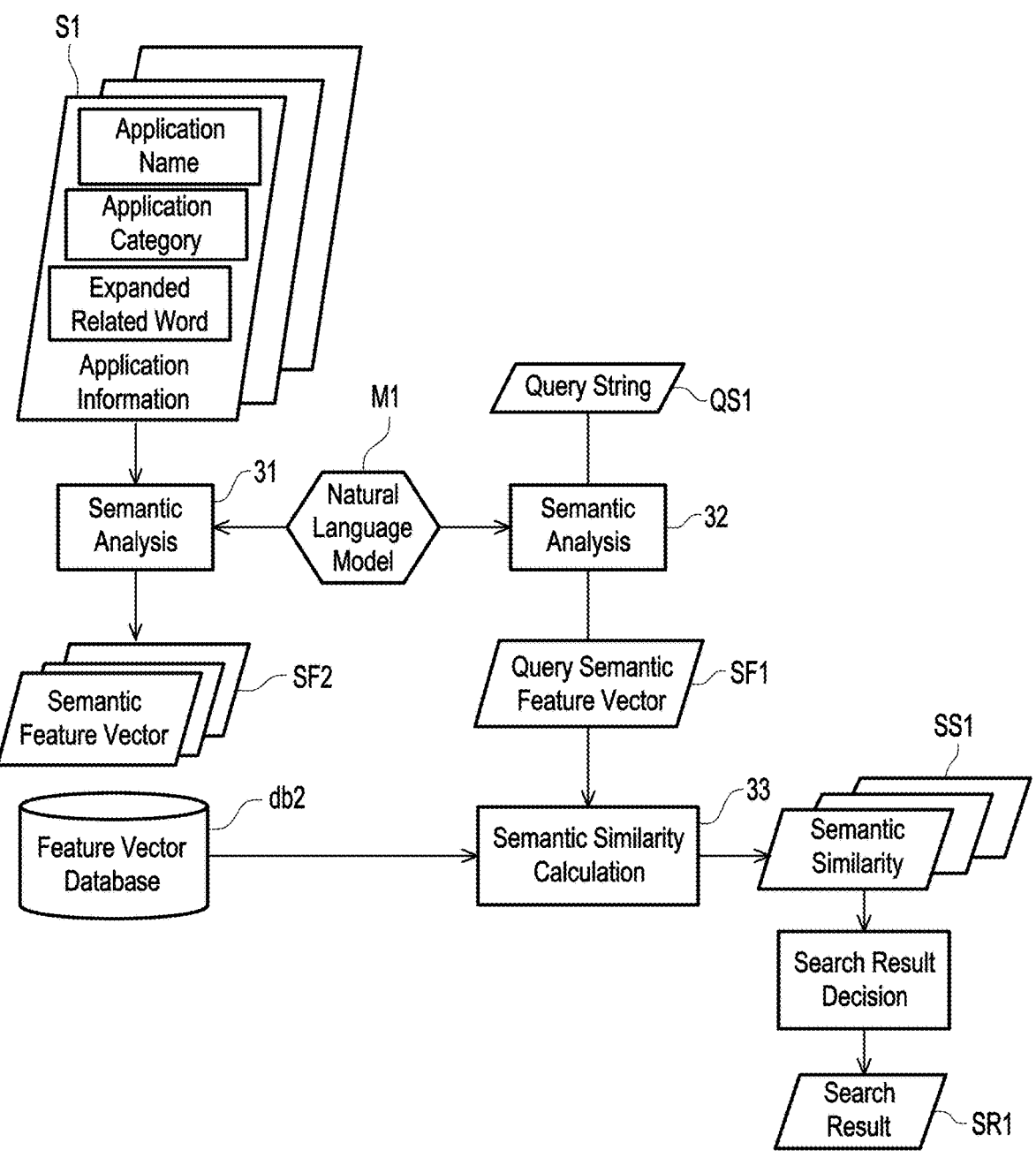
FIG. 3 is a schematic diagram of an application search method according to an embodiment of the disclosure.

As shown in FIG. 3, in the semantic analysis operation 31, the processor 140 may input the application information S1 of each application into the natural language model M1, so that the natural language model M1 outputs multiple semantic feature vectors SF2 of each application. Afterwards, multiple semantic feature vectors SF2 of each application may be recorded to feature vector database db2.

In some embodiments, the semantic feature vectors SF2 of each application at least include a first semantic feature vector associated with one of application categories and a second semantic feature vector associated with one of expanded related words. In some embodiments, the application categories may be application categories defined by the application download platform. That is, the application category corresponding to a certain application can be the program classification of the certain application on an application download platform. Moreover, each application category may be associated with a plurality of expanded related words, and these expanded related words may be generated based on the principle of word association. The processor 140 may input the application category and expanded related words of each application to the natural language model M1 respectively, and generate the first semantic feature vector and the second semantic feature vector of each application respectively.

In addition, in some embodiments, the processor 140 may input the application name of each application into the natural language model M1 to generate the third semantic feature vector of each application. That is, the semantic feature vectors SF2 of each application also include a third semantic feature vector associated with the application name. In other words, in some embodiments, the application information S1 may include at least the application name, application category and expanded related words.

Figure 4:
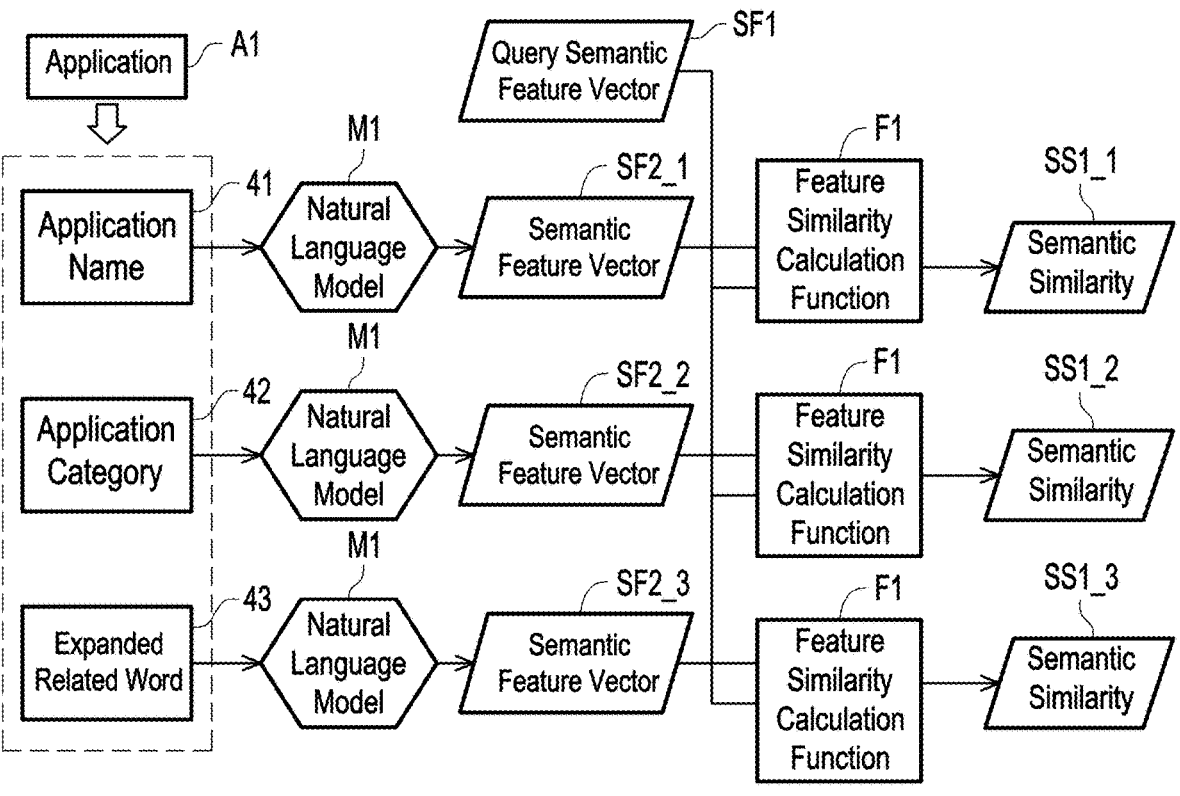
FIG. 4 is a schematic diagram of generating semantic feature vectors according to an embodiment of the disclosure.

For example, referring to FIG. 4, an application A1 installed on the electronic device 100 may correspond to the application name 41, the application category 42 and the expanded related words 43. The application name 41 may be input to the natural language model M1 to generate a semantic feature vector SF2_1 (i.e., the third semantic feature vector). The application category 42 may be input to the natural language model M1 to generate the semantic feature vector SF2_2 (i.e., the first semantic feature vector). The expanded related words 43 may be input to the natural language model M1 to generate the semantic feature vector SF2_3 (i.e., the second semantic feature vector). The semantic feature vector SF2_1, the semantic feature vector SF2_2, and the semantic feature vector SF2_3 of the application A1 may be recorded in the feature vector database db2 in the storage device 120. For example, Table 1 is a feature list of the semantic feature vectors of the applications. As shown in Table 1, "Application A" may correspond to semantic feature vectors V1 to V3 based on "Application Name NA", "Application category S1", and "Expanded related word S2". Similarly, "Application B" may correspond to semantic feature vectors V4 to V6 based on "Application Name NB", "Application category S3", and "Expanded related word S4". However, FIG. 4 and Table 1 respectively take an application corresponding to one expanded related word as an example, but this disclosure does not limit the number of expanded related words corresponding to a single application.

TABLE 1

|  | Application information | Semantic feature vectors |
| --- | --- | --- |
| Application A | Application Name NA | semantic feature vector V1 |
|  | Application category S1 | semantic feature vector V2 |
|  | Expanded related word S2 | semantic feature vector V3 |
| Application B | Application Name NB | semantic feature vector V4 |
|  | Application category S3 | semantic feature vector V5 |
|  | Expanded related word S4 | semantic feature vector V6 |
| . . . | . . . | . . . |

Next, in step S220, the processor 140 may obtain a query string QS1 through the input device 110. For example, the user may use the input device 110 to enter the query string QS1 in the input field of the user operation interface displayed by the display 130. Alternatively, the user may speak the query string QS1, and the processor 140 may receive audio input through the input device 110. The query string QS1 may include one word or multiple words, which is not limited in this disclosure.

In step S230, the processor 140 may generate a query semantic feature vector SF1 of the query string QS1 by using the natural language model M1. In detail, in the semantic analysis operation 32, the processor 140 may input the query string QS1 to the natural language model M1, so that the natural language model M1 outputs the query semantic feature vector SF1 of the query string QS1. In other words, the natural language model M1 may translate the query string QS1 into a query semantic feature vector SF1 in the multi-dimensional feature vector space.

In some embodiments, the natural language model M1 may include a BERT (Bidirectional Encoder Representations from Transformers) model, but it is not limited thereto. The natural language model M1 is generated by pre-training on a large amount of text in multiple languages. The machine learning method of the natural language model M1 involves self-supervised learning, specifically utilizing Masked Language Model (MLM) to perform the model training, so that the natural language model M1 may learn to understand the semantics of the input text. The natural language model M1 may output the output semantic feature vector of the input text in the multi-dimensional feature space according to the input text (i.e., the application information S1 and the query string QS1). The model parameters of the natural language model M1 may be recorded in the storage device 120.

In step S240, the processor 140 may determine a plurality of semantic similarities SS1 between the query semantic feature vector SF1 and the semantic feature vectors SF2 of each of the applications. In detail, each application of the electronic device 100 is associated with multiple semantic feature vectors SF2. In some embodiments, the processor 140 may calculate the semantic similarity between the query semantic feature vector SF1 of the query string QS1 and each semantic feature vector SF2 of each application. For example, the processor 140 may calculate cosine similarity, Euclidean Distance, or Manhattan Distance between the query semantic feature vector SF1 and each semantic feature vector SF2 to generate one semantic similarity between two semantic feature vectors.

In some embodiments, the processor 140 may calculate the first semantic similarity between the query semantic feature vector SF1 and the first semantic feature vector of each application. Furthermore, the processor 140 may calculate the second semantic similarity between the query semantic feature vector SF1 and the second semantic feature vector of each application. In addition, the processor 140 may calculate the third semantic similarity between the query semantic feature vector SF1 and the third semantic feature vector of each application. That is to say, the processor 140 may obtain the first semantic similarity based on the first semantic feature vector of the application category of each application, and may obtain the second semantic similarity based on the second semantic feature vector of the expanded related words of each application. In addition, the processor 140 may obtain the third semantic similarity based on the third semantic feature vector of the application name of each application.

For example, referring to FIG. 4, after obtaining the semantic feature vector SF2_1 of the application A1, the processor 140 may calculate the semantic similarity SS1_1 between the semantic feature vector SF2_1 and the query semantic feature vector SF1 according to the feature similarity calculation function F1. After obtaining the semantic feature vector SF2_2 of the application A1, the processor 140 may calculate the semantic similarity SS1_2 between the semantic feature vector SF2_2 and the query semantic feature vector SF1 according to the feature similarity calculation function F1. After obtaining the semantic feature vector SF2_3 of the application A1, the processor 140 may calculate the semantic similarity SS1_3 between the semantic feature vector SF2_3 and the query semantic feature vector SF1 according to the feature similarity calculation function F1. That is, the application A1 may be associated with multiple semantic similarities SS1_1 to SS1_3.

Returning to FIG. 2, in step S250, the processor 140 may determine at least one target application corresponding to the query string QS1 from the applications according to the semantic similarities SS1 corresponding to the semantic feature vectors SF2 of each of the applications. That is, the search result SR1 may include at least one of the applications. In some embodiments, the processor 140 may perform a weighted calculation on the semantic similarities of each application, and may select the target application based on the weighted calculation result of the semantic similarities of each application. In some embodiments, the processor 140 may compare the semantic similarities of each application with a preset threshold, and select the target application based on the comparison results.

Referring to FIG. 5, in some embodiments, step S250 may be implemented as step S510 to step S520. In step S510, the processor 140 may perform a weighted calculation based on the first semantic similarity and the second semantic similarity of each application to obtain a weighted similarity of each application. In some embodiments, the processor 140 may perform a weighted calculation according to the first semantic similarity of each application (such as the semantic similarity SS1_2 in FIG. 4), the second semantic similarity of each application (such as the semantic similarity SS1_3 in FIG. 4) and the third semantic similarity of each application (such as the semantic similarity SS1_1 in FIG. 4) to obtain a weighted similarity of each application. For example, the processor 140 may obtain a weighted similarity of each application according to the following equation (1).

$$Sw = (S_L * W_L + S_T * W_T + S_E * W_E)/(W_L + W_T + W_E) \qquad \text{equation (1)}$$

wherein Sw represents a weighted similarity; $S_L$ represents the third semantic similarity corresponding to the application name; $S_T$ represents the first semantic similarity corresponding to the application category; $S_E$ represents the second semantic similarity corresponding to the expanded related word; $W_L$ represents the weight corresponding to the application name; $W_T$ represents the weight corresponding to the application category; $W_E$ represents the weight corresponding to the expansion related words. In some embodiments, the weight $W_T$ and the weight $W_E$ may be greater than the weight $W_L$. This is because, comparatively, the semantic analysis value of the application name is lower, and thus the processor 140 may assign lower weight values to the third semantic similarity corresponding to the application name.

In some embodiments, a certain application may be associated with multiple expanded related words, and the processor 140 may correspondingly calculate a plurality of second semantic similarities based on these expanded related words. Afterwards, the processor 140 may extract the highest one of these second semantic similarities to calculate the weighted similarity of the application. In some embodiments, the application category of a certain application may include multiple category labels, and the processor 140 may correspondingly calculate multiple first semantic similarities based on the category labels. Afterwards, the processor 140 may calculate the weighted similarity of the application by taking the highest one of these first semantic similarities.

In step S520, the processor 140 may determine at least one target application corresponding to the query string QS1 from the applications based on the weighted similarity of each application. In some embodiments, step S520 may be implemented as step S521 to step S523.

In step S521, the processor 140 may compare the weighted similarity of each application with a preset threshold to determine at least one first application from the applications. The weighted similarity of this first application is greater than the preset threshold. That is to say, the processor 140 may first determine whether the weighted similarity of each application is greater than the preset threshold, so as to select at least one first application from these applications.

In step S522, the processor 140 may sort the weighted similarities of each first application to obtain the similarity ranking of each first application. That is, for the first applications with weighted similarities higher than the preset threshold, the processor 140 may sort the first applications from high to low according to the weighted similarities. According to the ranking results of the weighted similarities of these first applications, the processor 140 may obtain the similarity ranking of each first application.

In step S523, the processor 140 may determine at least one target application from the first application based on the similarity ranking of each first application. For example, the processor 140 may determine to select the X first applications with the top X similarity rankings as search results.

Referring to FIG. 6, in some embodiments, step S250 may be implemented as step S610 to step S620. In step S610, the processor 140 may compare the first semantic similarity of each application with the preset threshold, and may compare the second semantic similarity of each application with the preset threshold, so as to determine at least one first application from the applications. The first semantic similarity or the second semantic similarity of at least one first application is greater than the preset threshold. In addition, the processor 140 may also compare the third semantic similarity of each application with a preset threshold. That is, the processor 140 may determine whether the semantic similarity between each semantic feature vector of each application and the query semantic feature vector is greater than a preset threshold. For example, taking Table 1 as an example, the processor 140 may respectively determine whether the semantic similarities between the semantic feature vectors V1 to V6 and the query semantic feature vector are greater than a preset threshold. When one semantic similarity between a certain semantic feature vector of an application and the query semantic feature vector is greater than the preset threshold, the processor 140 may select the certain application as a first application.

In step S620, the processor 140 may sort the first semantic similarity and the second semantic similarity of each first application to obtain the similarity ranking of each first application. That is, for the first applications with one semantic similarity higher than the preset threshold, the processor 140 may sort these first applications from high to low according to the semantic similarities of the first applications. According to the ranking results of the semantic similarities of these first applications, the processor 140 may obtain the similarity ranking of each first application.

In step S630, the processor 140 may determine at least one target application from at least one first application based on the similarity ranking of each first application. For example, the processor 140 may determine to select the X first applications with the top X similarity rankings as the search result.

It should be noted that, FIG. 5 and FIG. 6 respectively show different decision-making methods for selecting target applications. In some embodiments, the processor 140 may select target applications sequentially based on different decision-making methods as illustrated in FIG. 5 and FIG. 6. Specifically, the processor 140 may first select target applications according to the decision-making method shown in FIG. 6. Next, if the decision-making method shown in FIG. 6 fails to select a sufficient number of target applications, the processor 140 may then select target applications based on the decision-making method shown in FIG. 5.

Therefore, through the use of the natural language model M1, even if the user does not enter the query string QS1 including the application name, the processor 140 may still search for the search result SR1 that meets the user's needs based on the semantics of the query string QS1.

Figure 7:
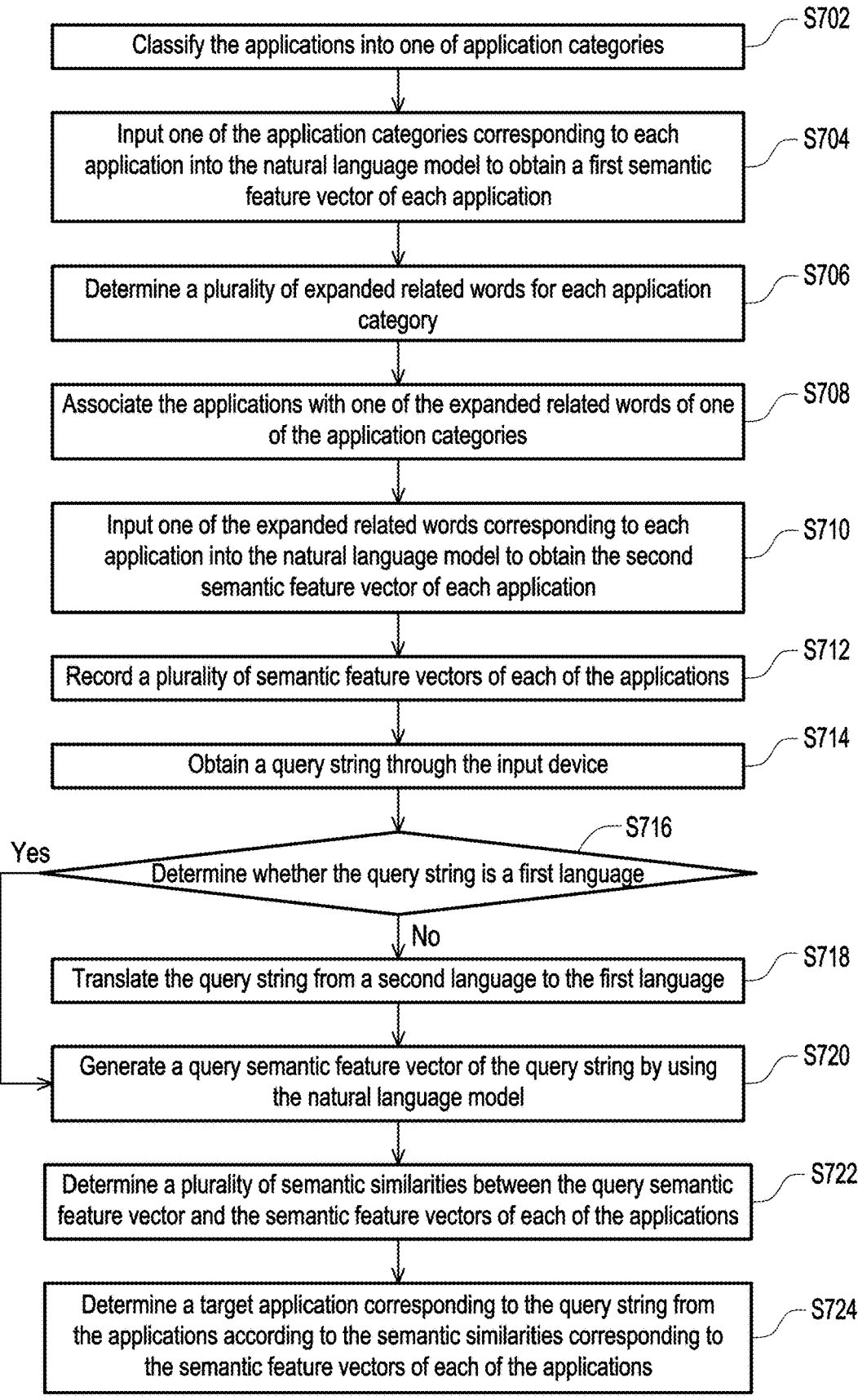
FIG. 7 is a flowchart of an application search method according to an embodiment of the disclosure.

Referring to FIG. 1 and FIG. 7, the method of this embodiment is applicable to the above-mentioned electronic device 100. The following is a detailed description of the application search method in this embodiment using various components of the electronic device 100.

In step S702, the processor 140 may classify a plurality of applications into one of application categories. In detail, each application may be classified into one of the application categories. For example, processor 140 may extract the application name and application category from the application download webpage using a web crawler. Taking the application "High-Speed Rail Mobile Ticketing Service" as an example, the processor 140 can retrieve the application name "High-Speed Rail Mobile Ticketing Service" and the category "Maps & Navigation" from the application download webpage.

In step S704, the processor 140 may input one of the application categories corresponding to each application into the natural language model to obtain the first semantic feature vector of each application program. For example, taking the application "High Speed Rail Mobile Ticketing Service" as an example, the processor 140 may input the application category "Maps", "Navigation" or "Maps Navigation" into the natural language model.

Figure 8:
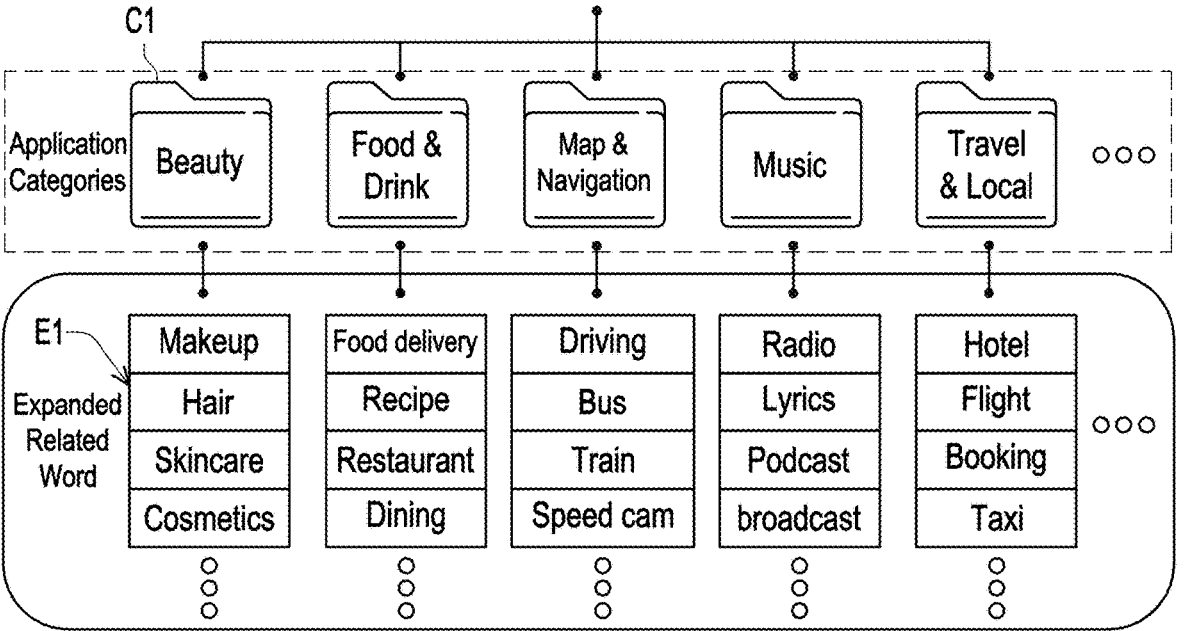
FIG. 8 is a schematic diagram of multiple application categories and multiple expanded related words according to an embodiment of the disclosure.

In step S706, the processor 140 may determine a plurality of expanded related words for each application category. For example, referring to FIG. 8, a plurality of application categories (e.g., application category C1) may respectively correspond to multiple expanded related words (e.g., expanded related word E1 of application category C1). It should be noted that, this disclosure does not limit the number of expanded related words under each application category.

In addition, in some embodiments, by observing multiple applications in a certain application category, the processor 140 may use word association principles to generate multiple candidate expanded related words for the application category. A certain candidate expanded related word may be first input into the natural language model to obtain the corresponding semantic feature vector, and based on the semantic feature vector of the candidate expanded related word, whether to serve the candidate expanded related word as a final expanded related word may be determined. Afterwards, the processor 140 may select the final expanded related words based on the semantic feature vectors of the candidate expanded related words. In this way, not only the richness of semantic feature vectors for each application is enhanced, but also useful expanded related words may be effectively filtered out.

In step S708, the processor 140 may associate the applications with one of the expanded related words of one of the application categories. For example, the processor 140 may determine one or more expanded related words corresponding to each application by looking up the table. In step S710, the processor 140 may input one of the expanded related words corresponding to each application into the natural language model to obtain the second semantic feature vector of each application program.

In step S712, the processor 140 may records the semantic feature vectors of each application. In step S714, the processor 140 may obtain a query string through the input device. The detail of step S712 to step S714 have been described in the previous embodiments and may not be described again here.

In step S716, the processor 140 may determine whether the query string is the first language. If the determination in step S716 is negative, in step S718, the processor 140 may translate the query string from the second language to the first language. For example, the processor 140 may translate the query string from the second language to the first language through the offline translation function. Afterwards, the processor 140 may generate a query semantic feature vector based on the query string translated into the first language. For some specific languages, the implementation of this translation step may improve the chance of successful search. If step S716 is determined to be yes, step S718 may be omitted.

In step S720, the processor 140 may use a natural language model to generate a query semantic feature vector of the query string. In step S722, the processor 140 may determine multiple semantic similarities between the query semantic feature vector and multiple semantic feature vectors of each application. In step S724, the processor 140 may determine the target application corresponding to the query string from the applications based on the semantic similarities corresponding to the semantic feature vectors of each application. The detail of step S720 to step S724 have been described in the previous embodiments and may not be described again here.

In summary, in embodiments of the disclosure, the search results of the query string may be determined based on the semantic similarity of the semantic feature vectors, and at least one of the applications is provided as the search result of the query string. Based on this, even if the user does not accurately enter the application name to search, the target application that meets the user's expectations may still be found, thus greatly improving the convenience and flexibility of application search. Moreover, by considering the expanded related words based on application categories, the relevance between the search results and the query string may be increased, thus generating search result that better align with the user's intent.

Although the present disclosure has been disclosed in the form of embodiments, they are not intended to limit the disclosure. Anyone with ordinary knowledge in the relevant technical field may make slight changes and modifications without departing from the spirit and scope of the disclosure. Therefore, the protection scope of this disclosure shall be determined by the appended patent application scope and its equivalent scope.

What is claimed is:

1. An application search method, adapted to an electronic device installed with a plurality of applications and comprising:
    recording a plurality of semantic feature vectors of each of the applications, wherein the semantic feature vectors of each of the applications at least comprise a first semantic feature vector associated with one of application categories and a second semantic feature vector associated with one of expanded related words;
    obtaining a query string via an input device;
    generating a query semantic feature vector of the query string by using a natural language model;
    determining a plurality of semantic similarities between the query semantic feature vector and the semantic feature vectors of each of the applications; and
    determining at least one target application corresponding to the query string from the applications according to the semantic similarities corresponding to the semantic feature vectors of each of the applications.

2. The application search method according to claim 1, wherein the step of determining the semantic similarities between the query semantic feature vector and the semantic feature vectors of each of the applications comprises:
    calculating a first semantic similarity between the query semantic feature vector and the first semantic feature vector of each of the applications; and
    calculating a second semantic similarity between the query semantic feature vector and the second semantic feature vector of each of the applications.

3. The application search method according to claim 2, wherein the step of determining the at least one target application corresponding to the query string from the applications according to the semantic similarities corresponding to the semantic feature vectors of each of the applications comprises:
    performing a weighted calculation based on the first semantic similarity and the second semantic similarity of each of the applications to obtain a weighted similarity of each of the applications; and
    determining the at least one target application corresponding to the query string from the applications according to the weighted similarity of each of the applications.

4. The application search method according to claim 3, wherein the step of determining the at least one target application corresponding to the query string from the applications according to the semantic similarities corresponding to the semantic feature vectors of each of the applications comprises:

comparing the weighted similarity of each of the applications with a preset threshold to determine at least one first application from the applications, wherein the weighted similarity of the at least one first application is greater than the preset threshold.

5. The application search method according to claim 4, wherein the step of determining the at least one target application corresponding to the query string from the applications according to the weighted similarity of each of the applications comprises:

sorting the weighted similarity of each of the at least one first application to obtain a similarity ranking of each of the at least one first application; and determining the at least one target application from the at least one first application according to the similarity ranking of each of the at least one first application.

6. The application search method according to claim 2, wherein the step of determining the at least one target application corresponding to the query string from the applications according to the semantic similarities corresponding to the semantic feature vectors of each of the applications comprises:

comparing the first semantic similarity of each of the applications with a preset threshold, and comparing the second semantic similarity of each of the applications with the preset threshold, to determine at least one first application from the applications, wherein the first semantic similarity or the second semantic similarity of the at least one first application is greater than the preset threshold.

7. The application search method according to claim 6, wherein the step of determining the at least one target application corresponding to the query string from the applications according to the semantic similarities corresponding to the semantic feature vectors of each of the applications further comprises:

sorting the first semantic similarity and the second semantic similarity of each of the at least one first application to obtain a similarity ranking of each of the at least one first application; and determining the at least one target application from the at least one first application according to the similarity ranking of each of the at least one first application.

8. The application search method according to claim 1, wherein before the step of recording the semantic feature vectors of each of the applications, the method further comprises:

classifying the applications into one of the application categories; and inputting one of the application categories corresponding to each of the applications into the natural language model to obtain the first semantic feature vector of each of the applications.

9. The application search method according to claim 8, also comprising:

determining the expanded related words for each of the application categories;

associating the applications respectively with one of the expanded related words of one of the application categories; and inputting one of the expanded related words corresponding to each of the applications into the natural language model to obtain the second semantic feature vector of each of the applications.

10. The application search method according to claim 1, wherein the semantic feature vectors of each of the applications further comprise a third semantic feature vector, and the method further comprises:

inputting an application name of each of the applications into the natural language model to generate the third semantic feature vector of each of the applications.

11. An electronic device with multiple applications installed, comprising:

an input device;

a storage device, configured to record instructions; and a processor, connected to the input device and the storage device, configured to execute the instructions to:

record a plurality of semantic feature vectors of each of the applications, wherein the semantic feature vectors of each of the applications at least comprise a first semantic feature vector associated with one of application categories and a second semantic feature vector associated with one of expanded related words;

obtain a query string via an input device;

generate a query semantic feature vector of the query string by using a natural language model;

determine a plurality of semantic similarities between the query semantic feature vector and the semantic feature vectors of each of the applications; and determine at least one target application corresponding to the query string from the applications according to the semantic similarities corresponding to the semantic feature vectors of each of the applications.

\* \* \* \* \*